United States Patent
Ittemann et al.

[11] Patent Number: 5,227,455
[45] Date of Patent: Jul. 13, 1993

[54] POLYMER GRANULES HAVING IMPROVED PROCESSABILITY

[75] Inventors: Peter Ittemann, Mannheim; Gerhard Heinz, Weisenheim, both of Fed. Rep. of Germany

[73] Assignee: BASF Aktiengesellschaft, Ludwigshafen, Fed. Rep. of Germany

[21] Appl. No.: 939,440

[22] Filed: Sep. 4, 1992

Related U.S. Application Data

[63] Continuation of Ser. No. 622,632, Dec. 5, 1990, abandoned.

[30] Foreign Application Priority Data

Dec. 14, 1989 [DE] Fed. Rep. of Germany ....... 3941280

[51] Int. Cl.$^5$ .................. C08G 8/02; C08G 14/00; C08G 75/00
[52] U.S. Cl. .................. 528/125; 528/126; 528/128; 528/170; 528/171; 528/172; 528/173; 528/175; 528/220; 528/223; 528/226
[58] Field of Search ............... 528/125, 126, 128, 170, 528/171, 172, 173, 175, 220, 223, 226

[56] References Cited

U.S. PATENT DOCUMENTS

| | | | |
|---|---|---|---|
| 3,441,538 | 4/1969 | Marks | 528/86 |
| 3,847,869 | 11/1974 | Williams, III | 528/170 |
| 3,850,885 | 11/1974 | Takekoshi et al. | 528/170 |
| 3,875,116 | 4/1975 | Heath et al. | 528/208 |
| 3,953,400 | 4/1976 | Dahl | 528/179 |
| 4,108,837 | 8/1978 | Johnson et al. | 528/126 |
| 4,320,224 | 3/1982 | Rose et al. | 528/125 |
| 4,857,625 | 8/1989 | Clendinning et al. | 528/171 |
| 4,867,912 | 9/1989 | Heinz et al. | 528/125 |
| 4,942,216 | 7/1990 | Heinz et al. | 528/125 |
| 5,013,816 | 5/1991 | Heinz et al. | 528/173 |

FOREIGN PATENT DOCUMENTS

| | | |
|---|---|---|
| 0185130 | 6/1986 | European Pat. Off. |
| 0265842 | 5/1988 | European Pat. Off. |
| 0343606 | 11/1989 | European Pat. Off. |
| 1512082 | 12/1967 | France |

WO8403891 10/1984 PCT Int'l Appl.

*Primary Examiner*—John Kight, III
*Assistant Examiner*—Shelley A. Dodson
*Attorney, Agent, or Firm*—Oblon, Spivak, McClelland, Maier & Neustadt

[57] ABSTRACT

Premix for the production of mouldings, containing
A) from 40-99.95% by weight of polymer granules A based on a polyaryl ether sulfone, polyaryl ether ketone, polyimide, polyamide imide or polyether imide, or a mixture thereof,
B) up to 50% by weight of fillers B in fiber or particle form, or a mixture thereof,
C) from 0.05-10% by weight of a compound C ether of the general formula X

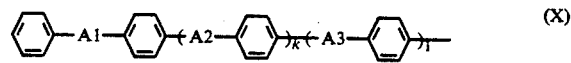

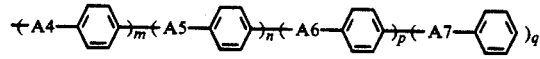

where A1 to A7 are identical or different and, independently of one another, are a radical of the formula —CO—, —O—, —S—, —SO$_2$—, —C(CH$_3$)$_2$—, a chemical bond,

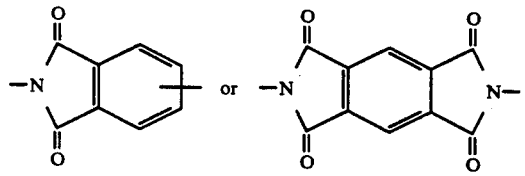

and k, l, m, n, p and q are each 0 or 1, or a C$_1$-C$_8$-alkyl, C$_1$-C$_8$-alkoxy or cyano derivative thereof which is substituted on the aromatic ring, or of the general formula Y -continued
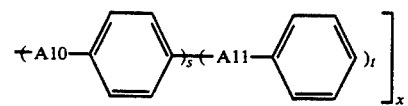
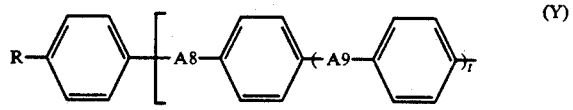 (Y)
where R is $C_1$–$C_8$-alkyl, $C_1$–$C_8$-alkoxy or cyano, A8 to A11 are as defined for A1 to A7, r, s and t are 0 or 1, and x is 2, 3 or 4, or a mixture thereof, is described.
5 Claims, No Drawings

POLYMER GRANULES HAVING IMPROVED PROCESSABILITY

This application is a continuation of application Ser. No. 07/622,632, filed on Dec. 5, 1990, now abandoned.

The present invention relates to readily processable polymer granules based on polyaryl ether sulfones, polyaryl ether ketones, polyimides, polyamide imides or polyther imides, or mixtures thereof, which may contain frbrous or particulate fillers, or mixtures thereof.

The invention furthermore relates to the use of the polymer granules according to the invention for the production of fibers, films, moldings and composite materials, and to moldings produced from the polymer granules.

Polyaryl ether sulfones, polyaryl ether ketones, polyimides, polyether imides and polyamide imides are important for many applications due to their high heat resistance. Due to their high melting or softening point, processing of these plastics must be carried out at elevated temperatures. Even then, the melt viscosity is frequently so high that, in particular in the case of relatively high-molecular-weight products, problems may occur during processing (for example high power consumption of the extruder). This is particularly true if fillers are to be simultaneously incorporated in relatively large amounts during processing. The result is frequently uneven incorporation of the fillers or an unsatisfactory surface of the extrudates or injection moldings.

It was therefore an object of the present invention to provide polymer granules having improved processability which can be processed at relatively low temperatures or with relatively low power consumption, and into which fillers in relatively large amounts can be incorporated more easily.

We have found that this object is achieved according to the invention by premixes which contain A) from 40–99.95% by weight of polyer granules based on a polyaryl ether sulfone, polyaryl ether ketone, polyimide, polyamide imide or polyether imide, or a mixture thereof, B) up to 50% by weight of fillers in fiber or particle form, or a mixture thereof, and C) from 0.05–10% by weight of a compound of the general formula X

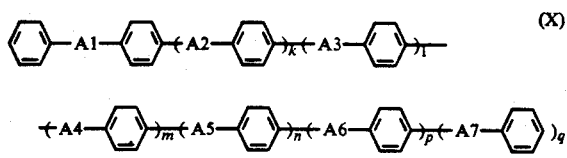

where A1, A2, A3, A4, A5, A6 and A7 are identical or different and, independently of one another, are a radical of the formula $-CO-$, $-O-$, $-S-$, $-SO_2-$, $-C(CH_3)_2-$, a chemical bond,

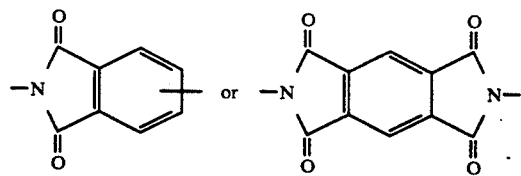

and k, l, m, n, p and q are each 0 or 1, or a $C_1$-$C_8$-alkyl, $C_1$-$C_8$-alkoxy or cyano derivative thereof which is substituted on the aromatic ring, or of the general formula Y

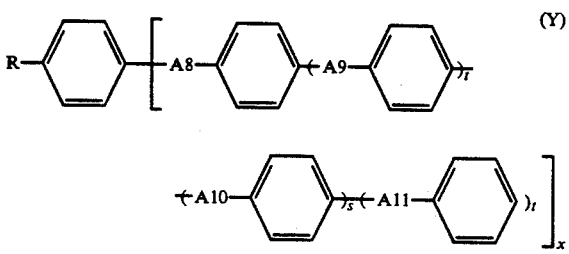

where R is $C_1$-$C_8$-alkyl, $C_1$-$C_8$-alkoxy or cyano, A8 A9, A10 and A11 are as defined for A1 to A7, r, s and t are 0 or 1, and x is 2, 3 or 4, or a mixture thereof.

The high temperature resistant polyaryl ether sulfone, polyaryl ether ketone, polyimide, polyether imide and polyamide imide polymers used for the granules A) are known per. ie. and are described in the literature or commercially available, and further details are thus superfluous here.

The polyaryl ether ketones, polyaryl ether sulfones and polyether imides which are described in greater detail below are preferred.

Polyaryl ether ketones are, for example, those described in U.S. Pat. No. 4,320,224 (EP 1879) or EP-A-265,842. In corresponding manner to EP-A-265,842, the polyaryl ether ketones preferably contain recurring units of the formulae I and/or II

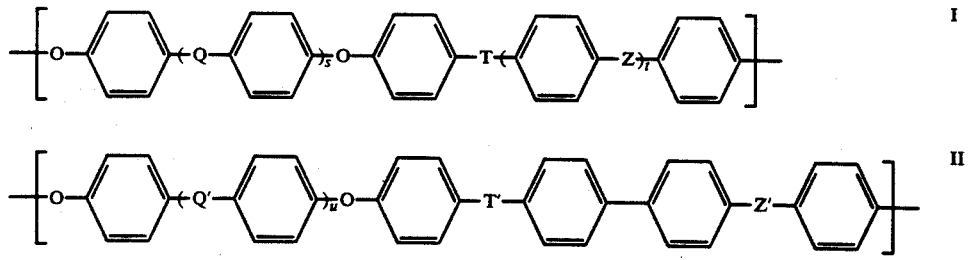

or units of ring-substituted $C_1$-$C_6$-alkyl, $C_1$-$C_6$-alkoxy, phenyl, chloro or fluoro derivatives thereof, where Q, Q', T, T', Z and Z' may each be $-CO-$, CR'R'', a chemical bond or $-O-$, and at least one of the substituents Q, T and Z or Q', T' and Z' is $-CO-$, R' and R'' are each hydrogen, $C_1$-$C_6$-alkyl or -alkoxy, aryl or fluoro or chloro derivatives thereof, and s, t and u are each 0 or 1.

Examples of units of the general formulae I and II are:

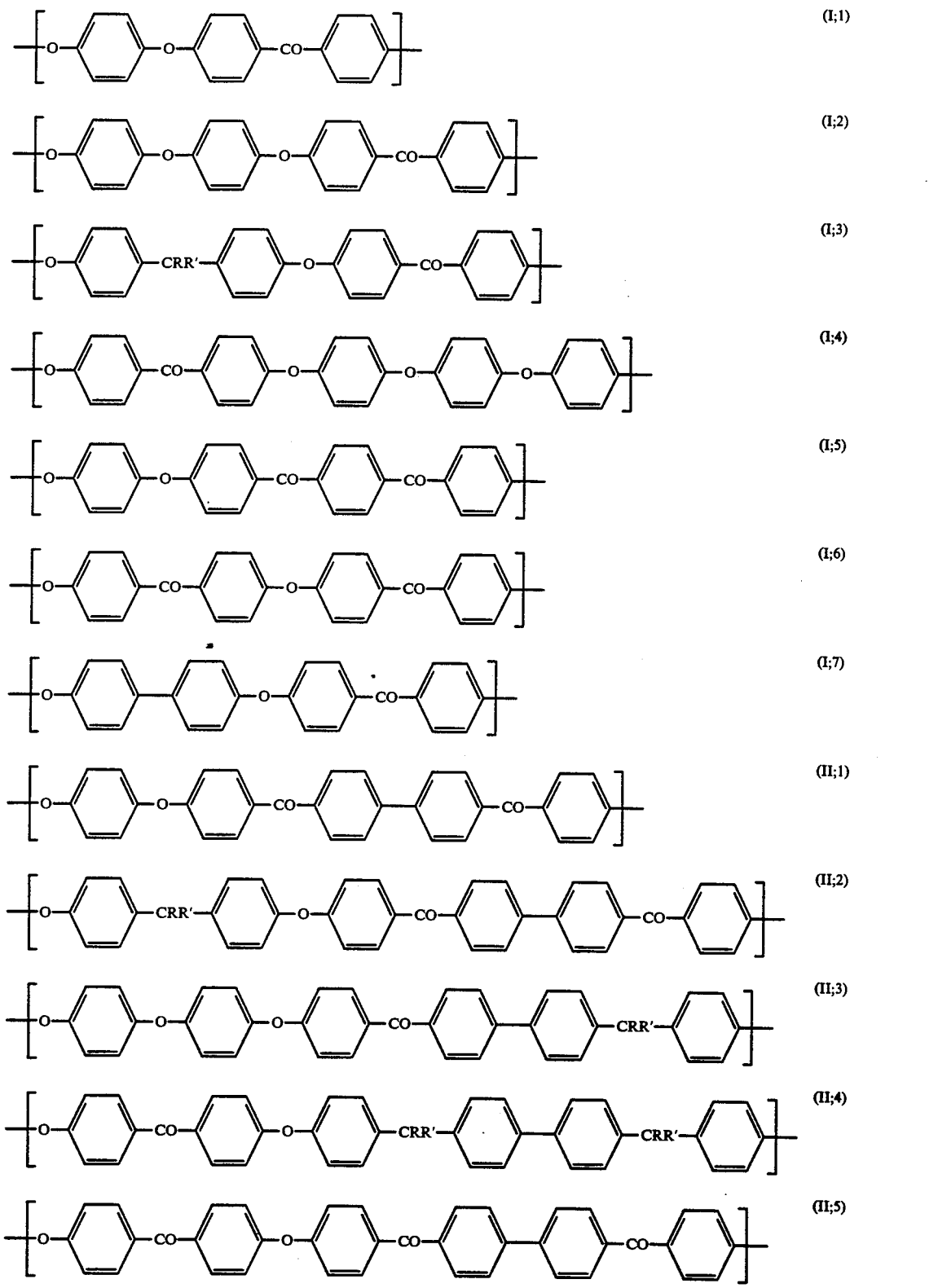
this selection only being representative of the units which come under the general formulae I and II. The 65 examples above can be described as follows by means of the substituents Q, T, Z or Q', T', Z' and the parameters s, t and u:
| | s | t | Q | T | Z |
|---|---|---|---|---|---|
| I;1 | 0 | 0 | — | —CO— | — |
| I;2 | 1 | 0 | —O— | —CO— | — |
| I;3 | 1 | 0 | —CRR'— | —CO— | — |

-continued

| | | | | | |
|---|---|---|---|---|---|
| I;4 | 1 | 1 | —CO— | —O— | —O— |
| I;5 | 0 | 1 | — | —CO— | —CO— |
| I;6 | 1 | 0 | —CO— | —CO— | — |
| I;7 | 1 | 0 | chem. bond | —CO— | — |

| | u | Q' | T' | Z' |
|---|---|---|---|---|
| II;1 | 0 | — | —CO— | —CO— |
| II;2 | 1 | —CRR'— | —CO— | —CO— |
| II;3 | 1 | —O— | —CO— | —CRR'— |
| II;4 | 1 | —CO— | —CRR'— | —CRR'— |
| II;5 | 1 | —CO— | —CO— | —CO— |

Although, as stated above, any desired combinations of the substituents Q, T and Z or Q', T' and Z' are possible in principle, preferred units are generally those in which T and Z or T' and Z' are identical since the corresponding monomers are generally more readily accessible.

Processes for the preparation of polyaryl ether ketones of this type are known per se and described, for example, in U.S. Pat. No. 4,320,224 (EP 1879), WO-A 84/03,891, U.S. Pat. No. 3,441,538, and U.S. Pat. No. 3,953,400. In principle, both the nucleophilic and electrophilic polycondensations are possible.

Polyaryl ether sulfones can also be employed for the granules A).

Appropriate products are known per se and commercially available. Reference may be made here, only in an illustrative manner, to polyaryl ether sulfones, containing recurring units obtained by replacing —CO— in the formulae given above for the polyaryl ether ketones by —SO₂—. Processes for the preparation of products of this type are generally known and are described, for example, in U.S. Pat. No. 4,108,837 (DE-B-1,545,106), U.S. Pat. No. 4,857,625 (EP-A-113,112) and EP-A-185,130.

The polyether imides which can also be used as component A) are essentially built up from recurring units of the formula III

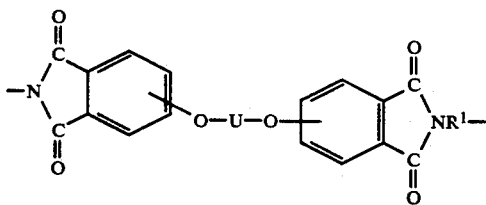

III where U is a divalent aromatic organic radical having from 6 to 30 carbon atoms, and R¹ is a divalent organic radical comprising a) an aromatic hydrocarbon radical having from 6 to 20 carbon atoms and/or a halogenated derivative thereof, b) an alkylene radical, polydiorganosiloxane radical or cycloalkylene radical having up to 20 carbon atoms, or c) the divalent radical of the formula

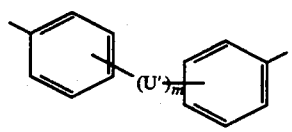

where —(U')— is

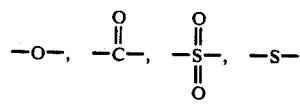

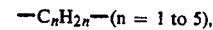

or

—C$_n$H$_{2n}$—(n = 1 to 5), and m is 0, 1 or 2.

Particularly preferred products are those in which R¹ is as defined above and U is

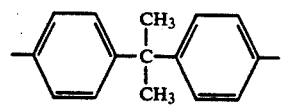

Processes for the preparation of polyether imides are disclosed, for example, in U.S. Pat. No. 3,875,116 (DE 2,363,785), U.S. Pat. No. 3,847,869 (DE 2,437,286) and U.S. Pat. No. 3,850,885 (DE 2,441,539).

It goes without saying that mixtures of two or three of the abovementioned high temperature resistant polymers can also be employed.

The proportion of polymers, ie. granules, in the premixes according to the invention is from 40–99.5% by weight, preferably from 50–79.95% by weight and in particular from 50–69.95% by weight, based on the total weight of the premix.

As component B), the premixes or polymer granules according to the invention can contain up to 50% by weight, preferably from 5–45% by weight and in particular from 10–40% by weight of fillers in fiber or particle form, or a mixture thereof, this amount being based on the premix.

Examples of reinforcing fillers which may be mentioned are asbestos, carbon fibers and preferably glass fibers, which can be employed, for example, in the form of glass fabrics, mats, nonwovens and/or glass silk rovings or cut glass silk made from low-alkali E glasses having a diameter of from 5–200 μm, preferably from 8–50 μm, the fillers in fiber form preferably having, after incorporation, a mean length of from 0.05–1 mm, in particular from 0.1–0.5 mm.

Examples of other suitable fillers are wollastonite, calcium carbonate, glass spheres, quartz sand, silicon nitride, boron nitride, or mixtures thereof.

The preferred fillers are glass fibers, in particular in combination with calcium carbonate or other alkali metal or alkaline earth metal carbonates.

The premixes according to the invention contain from 0.05–10% by weight, preferably from 0.05–2% by weight and in particular from 0.1–1% by weight, of a low-molecular-weight organic compound either of the general formula X

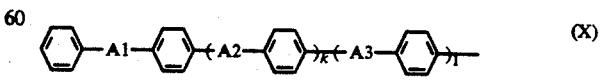

(X)

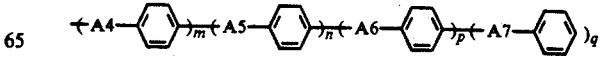

where A1, to A7 are identical or different and, independently of one another, are a radical of the formula —CO—, —O—, —S—, —SO$_2$—, —C(CH$_3$)$_2$—, a chemical bond,
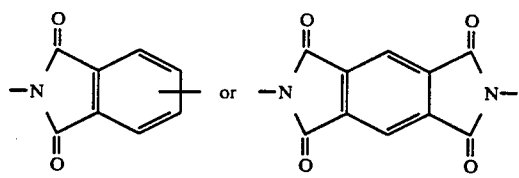
and k, l, m, n, p and q are each 0 or 1, or a C$_1$–C$_8$-alkyl, C$_1$–C$_8$-alkoxy or cyano derivative thereof which is substituted on the aromatic ring, or of the general formula Y
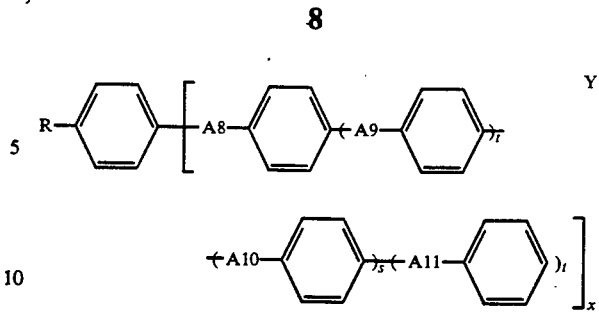
where R is C$_1$–C$_8$-alkyl, C$_1$–C$_8$-alkoxy or cyano, A8 to A11 are as defined for A1 to A7, r, s and t are 0 or 1, and x is 2, 3 or 4, or a mixture thereof.
Some suitable compounds are listed below:
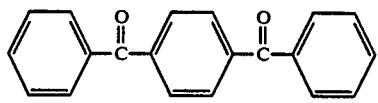 (X;1)
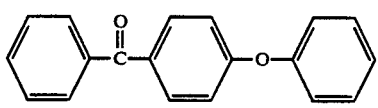 (X;2)
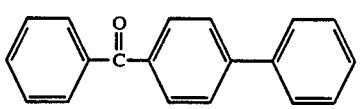 (X;3)
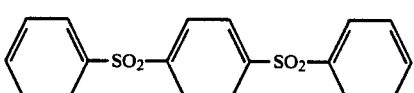 (X;4)
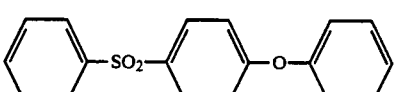 (X;5)
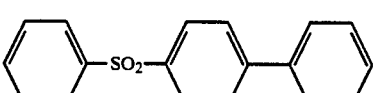 (X;6)
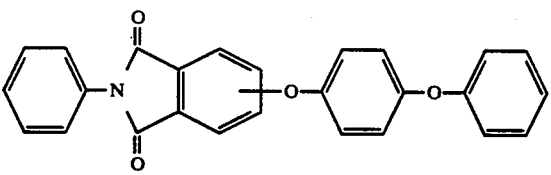 (X;7)
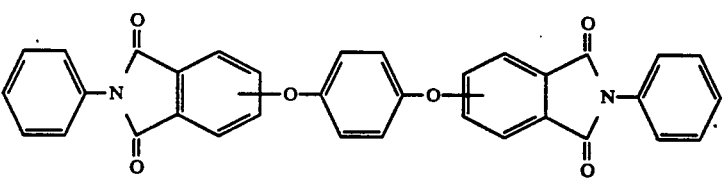 (X;8)
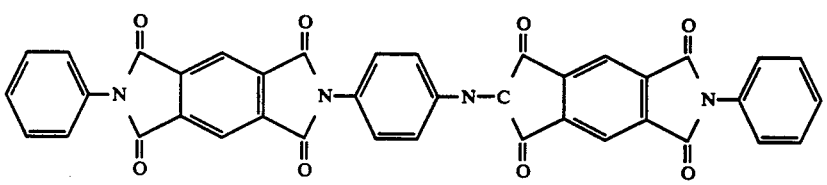 (X;9)

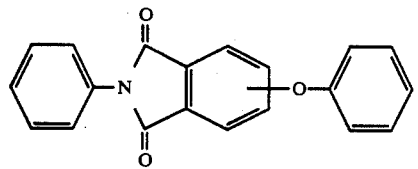 (X;10)
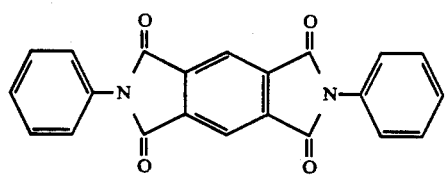 (X;11)
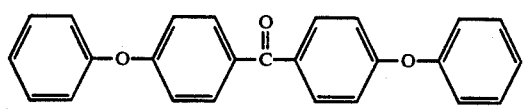 (X;12)
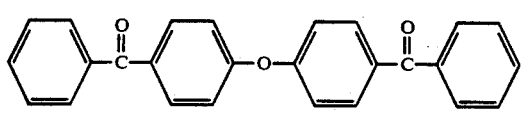 (X;13)
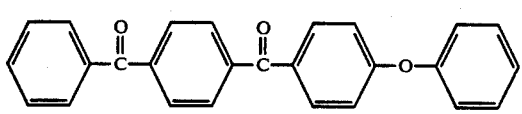 (X;14)
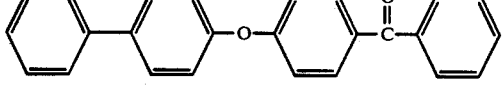 (X;15)
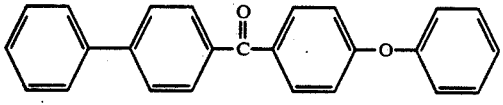 (X;16)
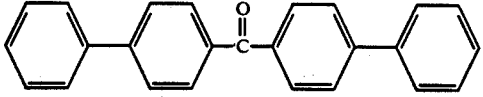 (X;17)
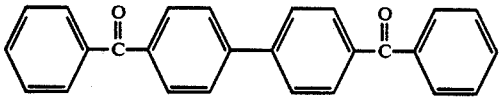 (X;18)
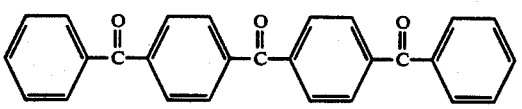 (X;19)
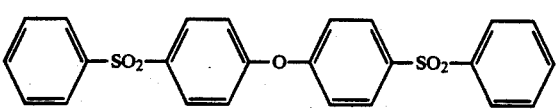 (X;20)
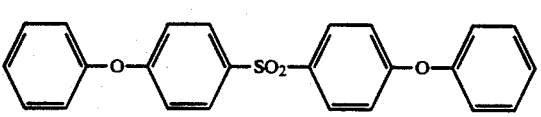 (X;21)
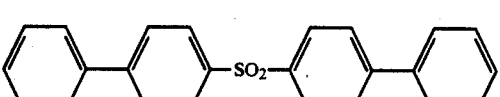 (X;22)

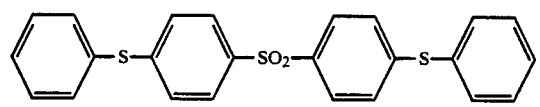 (X;23)
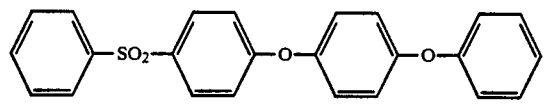 (X;24)
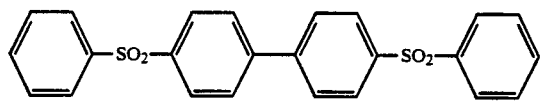 (X;25)
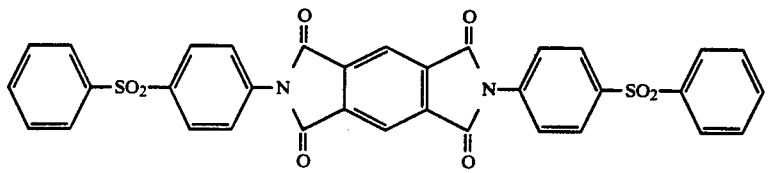 (X;26)
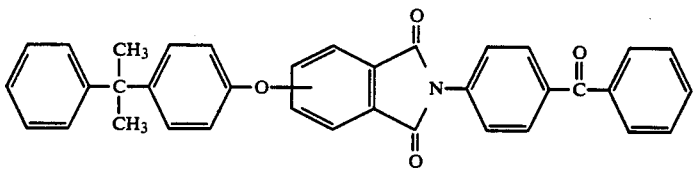 (X;27)
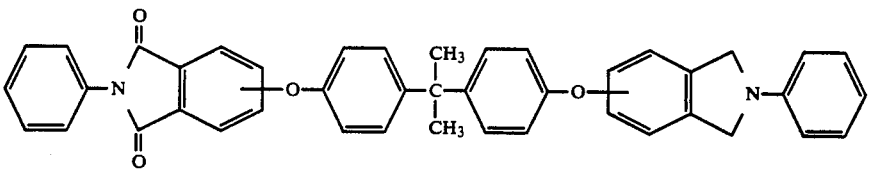 (X;28)
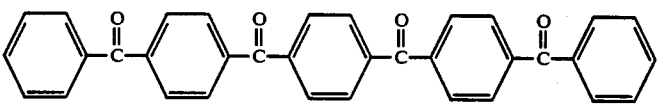 (X;29)
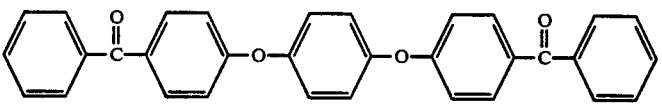 (X;30)
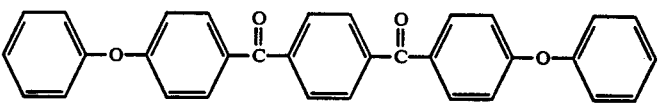 (X;31)
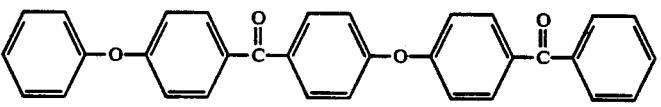 (X;32)
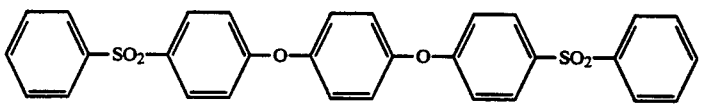 (X;33)
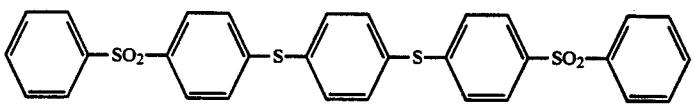 (X;34)

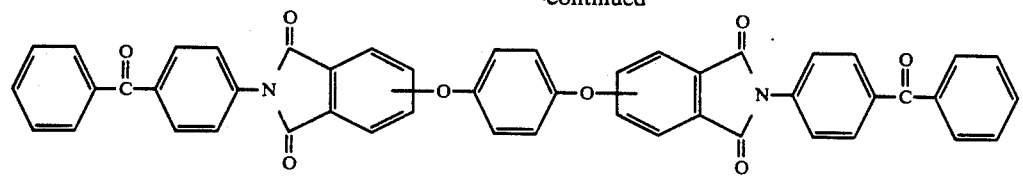 (X;35)
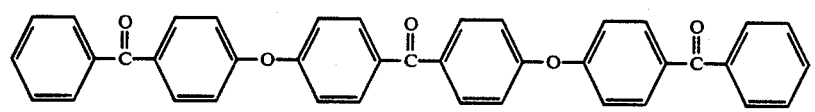 (X;36)
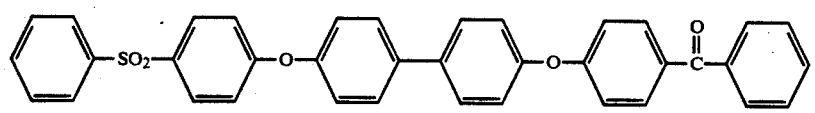 (X;37)
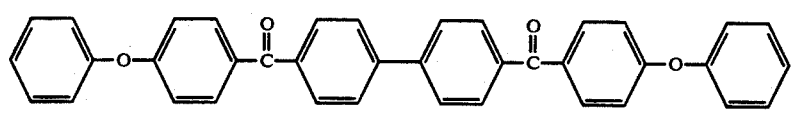 (X;38)
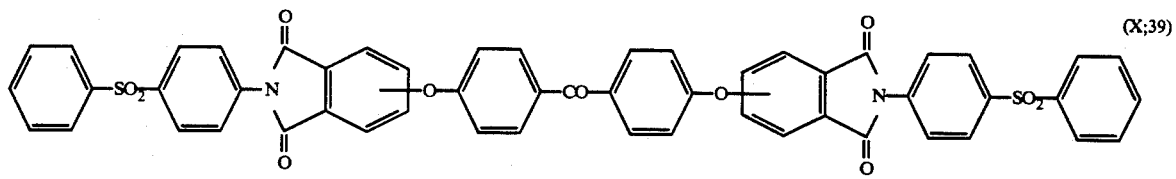 (X;39)
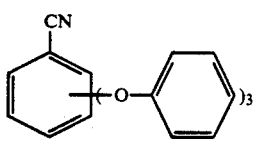 (Y;1)
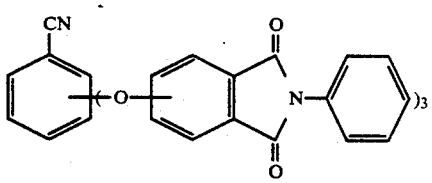 (Y;2)
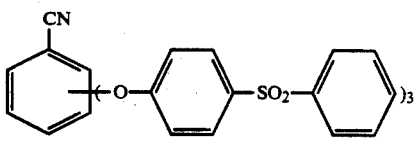 (Y;3)
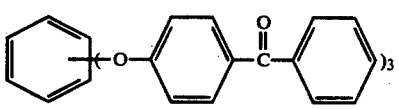 (Y;4)
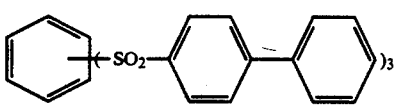 (Y;5)
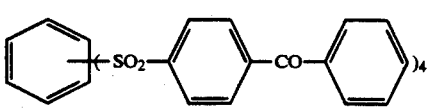 (Y;6)
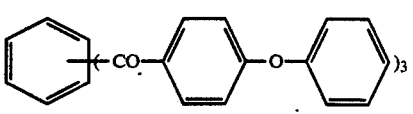 (Y;7)

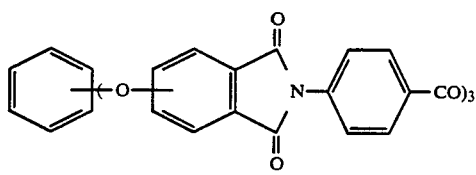

(Y;8)

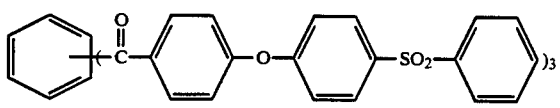

(Y;9)

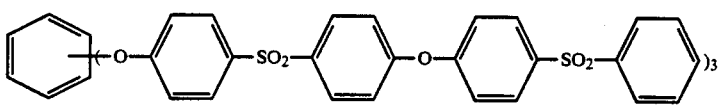

(Y;10)

The compounds of the general formulae X and Y are commercially available or can be prepared by processes of organic chemistry which are known to those skilled in the art, and further details in this respect are therefore superfluous.

In general, preferred compounds of the formula X or Y are those in which the substituents linking the aromatic rings are the same as those also present in polymer A; however, this is not absolutely necessary.

The compounds C should be present in the premix in the form of an intimate mixture with the granules, ie. for example in the form of s shell around each individual granule.

The outer shell can be applied by conventional processes known to those skilled in the art, such as coating in a tumble mixer or by rolling the components to and fro in a drum. The application temperature here should be selected so that the compounds of the formula X or Y are applied as an outer shell to the polymer granules of polymer A, ie. the application should be carried out at below the melting point of the granules. In a preferred procedure, the outer shell in the case of filler-containing polymer granules is applied before incorporation of the filler.

The polymer granules pretreated according to the invention have good processability, in particular even at high filler contents, and are therefore particularly suitable for the production of fibers, films, moldings and composite materials.

EXAMPLES

The following components were employed:
A) Polyaryl ether sulfone containing recurring units of the formula

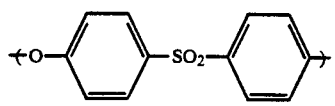

and having a relative viscosity of 1.68, measured in phenol/o-dichlorobenzene (weight ratio 1:1) (Ultrason ® E3000 from BASF AG).

B) Glass fibers

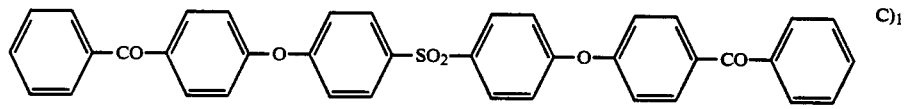

(C)₁ prepared by reacting 4,4'-dihydroxybiphenyl sulfone with 4-fluorobenzophenone in the molar ratio 1:2

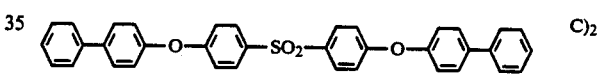

(C)₂ prepared by reacting 4,4'-dichlorobiphenyl sulfone with 4-hydroxybiphenyl in the molar ratio 1:2

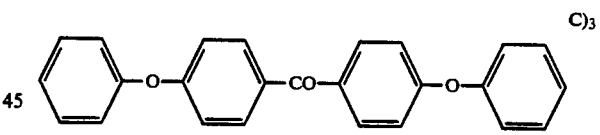

(C)₃ prepared by reacting 4,4'-difluorobenzophenone with phenol in the molar ratio 1:2

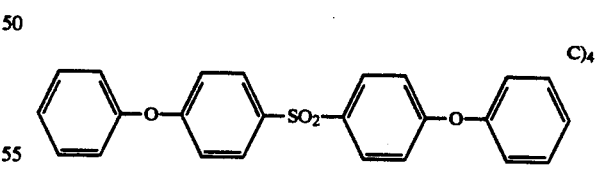

(C)₄ prepared by reacting 4,4'-dichlorobiphenyl sulfone with phenol in the molar ratio 1:2

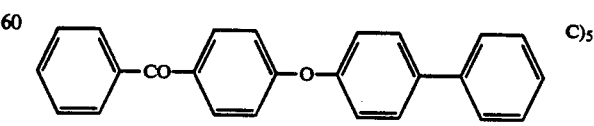

(C)₅ prepared by reacting 4-fluorobenzophenone with 4-hydroxybiphenyl

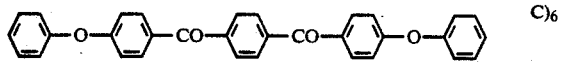

C)6 prepared by reacting 1,4-di(4-fluorophenylcarbonyl)-benzene with phenol in the molar ratio 1:2

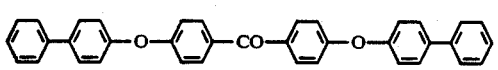

C)7 prepared by reacting 4,4'-difluorobenzophenone with 4-hydroxybiphenyl in the molar ratio 1:2

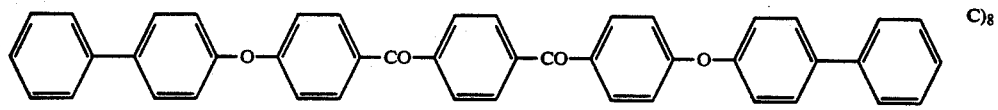

C)8 prepared by reacting 1,4-di(4-fluorophenylcarbonyl)-benzene with 4-hydroxybiphenyl in the molar ratio 1:2

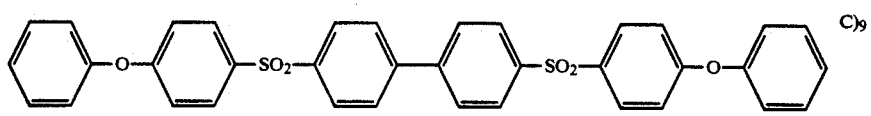

C)9 prepared by reacting 4,4'-di(4-chlorophenylsulfonyl)-biphenyl with phenol in the molar ratio 1:2.

In each example, 30 g (0.3% by weight) of the particular compound C)1 to C)9 were first applied as an outer shell to 10 kg of component A by rolling the components to and fro in a drum at room temperature. The product was subsequently blended and extruded together with 30% by weight of glass fibers in a Werner & Pfleiderer twin-screw extruder (ZSK53). The relative power consumption of the extruder and the minimum extrusion temperature required were measured at a constant throughput of 30 kg/h.

The results are shown in the table below.

TABLE

| | Compound C | Amount applied [%] | Relative power consumption of the extruder [%] | Extrusion temperature (minimum) [°C.] |
|---|---|---|---|---|
| Comparison Example: | — | — | 75 | 380 |
| Example 1 | C)1 | 0.3 | 65 | 370 |
| Example 2 | C)2 | 0.3 | 68 | 370 |
| Example 3 | C)3 | 0.3 | 60 | 370 |
| Example 4 | C)4 | 0.3 | 66 | 370 |
| Example 5 | C)5 | 0.3 | 65 | 370 |
| Example 6 | C)6 | 0.3 | 67 | 370 |
| Example 7 | C)7 | 0.3 | 66 | 370 |
| Example 8 | C)8 | 0.3 | 67 | 370 |
| Example 9 | C)9 | 0.3 | 70 | 370 |

It should be particularly emphasized that it was necessary to carry out the comparison example using an estrusion temperature 10° C. higher than in the other examples in order to achieve uniform good mixing.

We claim:

1. A premix for the production of a molding, containing

A) from 40–99.95% by weight of polymer granules A based on a polyaryl ether sulfone,
B) up to 50% by weight of fillers B in fiber or particle form, or a mixture thereof, and
C) from 0.05–10% by weight of a compound C of the formula X

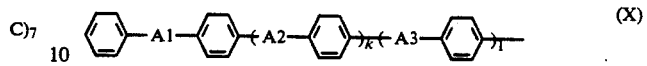

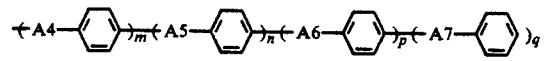

(X)

where A1 to A7 are identical or different and, independently of one another, are a radical of the formulas (I) to (VII) —CO— (I), —O— (II), —S— (III), —SO$_2$—

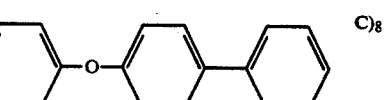

(IV), —C(CH$_3$)$_2$— (V),

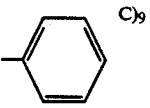

(VI)

or

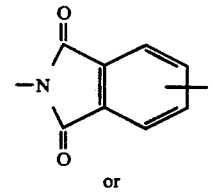

(VII)

or a single bond, and k, l, m, n, p and q are each 0 or 1, whereby at least one of A1 to A7 is selected from the group of the radicals (I) to (VII), or A1 is a single bond and k, l, m, n, p and q are each 0, or a C$_1$-C$_8$-alkyl, C$_1$-C$_8$-alkoxy or cyano derivative thereof which is substituted on the aromatic ring, whereby A1 to A7 are identical or different and independently of one another are a radical (I) to (VII) or a single bond and k, l, m, n, p and q are each 0 or 1.

2. A premix as claimed in claim 1, containing granules of a mixture of two polymers A in the mixing ratio 5:95 to 95:5.

3. A premix as claimed in claim 1, containing from 5 to 50% by weight of component B.

4. A method of using a premix as claimed in claim 1 for the production of moldings and composite materials.

5. A molding made from a mixture as claimed in claim 1.

* * * * *